Feb. 21, 1967  A. G. KIEFER  3,304,560
TURBULENCE-REDUCING DEVICE FOR SWIMMING POOLS
Filed Aug. 5, 1964  2 Sheets-Sheet 1

INVENTOR
ADOLPH G. KIEFER

BY Fisher, Christen, Sabol & Caldwell
ATTORNEYS

Feb. 21, 1967  A. G. KIEFER  3,304,560
TURBULENCE-REDUCING DEVICE FOR SWIMMING POOLS
Filed Aug. 5, 1964  2 Sheets-Sheet 2

INVENTOR
ADOLPH G. KIEFER

BY Fisher, Christen, Sabol & Caldwell
ATTORNEYS

United States Patent Office 3,304,560
Patented Feb. 21, 1967

3,304,560
TURBULENCE-REDUCING DEVICE FOR SWIMMING POOLS
Adolph G. Kiefer, Northfield, Ill., assignor to Adolph Kiefer & Company, Northfield, Ill., a corporation of Illinois
Filed Aug. 5, 1964, Ser. No. 387,628
15 Claims. (Cl. 4—172)

This invention relates to aquatic devices and, in particular, to equipment for reducing turbulence and wave action in swimming pools and other bodies of water.

This wave action, and the attending underwater cross-currents set up thereby, are not only a detriment to swimmers, but can also be dangerous.

In an enclosed body of water, such as a swimming pool, this wave action is caused by the activity of the swimmers themselves and the fact that the waves are not dissipated but "bounced back" by the unresistant walls of the pool.

Therefore, to counteract this effect, the present invention provides means disposed at the water line having perforate wall surfaces extending above and below the water line which tend to break up the waves and thus dampen movement of the water and to dissipate its force.

Furthermore, a series of such surfaces may be disposed as by means of a cable attached at opposite ends of a pool in a manner to create swimming lanes therein.

Another object of the invention is to provide float means of novel construction capable of supporting such devices at the proper level in the water.

Other objects and advantages will be apparent to those skilled in the art after reading the following specification in which.

FIGS. 5, 6, 7, and 8, are transverse cross-sectional views of modified forms of turbulence-reducing devices.

Figure 1:
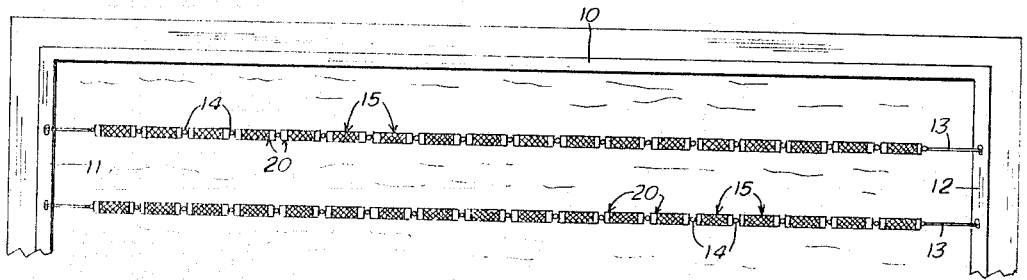
FIG. 1 is a plan view of a portion of a swimming pool showing two strings of turbulence-reducing devices made in accordance with the teachings of this invention, arranged to form a lane for swimmers in competitive racing.

FIG. 1 shows a plan view of one side of a rectangular swimming pool having a side wall 10 and oppositely facing end walls 11 and 12. As is the usual practice, cables 13, attached to fastenings on the end walls are provided at, or above, the water level in the pool to mark lanes for contestants in swimming races.

In order to reduce the amount of tension in the cables, it is the usual practice to string floats 14 along the cable at spaced intervals, only so many of these floats being used as will provide adequate support for the cable at the water line, without placing undue strain at the end fastenings.

However, in the case of the present invention, a plurality of elongated turbulence-reducing devices, each individually indicated generally by the numeral 15, are also strung on the cables 13 preferably, but not necessarily, separated from each other by the floats 14.

Each of the devices 15 comprises a generally elongated body having a generally perforated surface presented to the surface of the water and preferably constructed of a material sufficiently buoyant so that a major portion of the surface of the body tends to remain above the water line, or if the material is not sufficiently buoyant, the device should include float means to maintain the body in such a position so as not to create a downward drag on the cable 13.

Figures 2, 3:
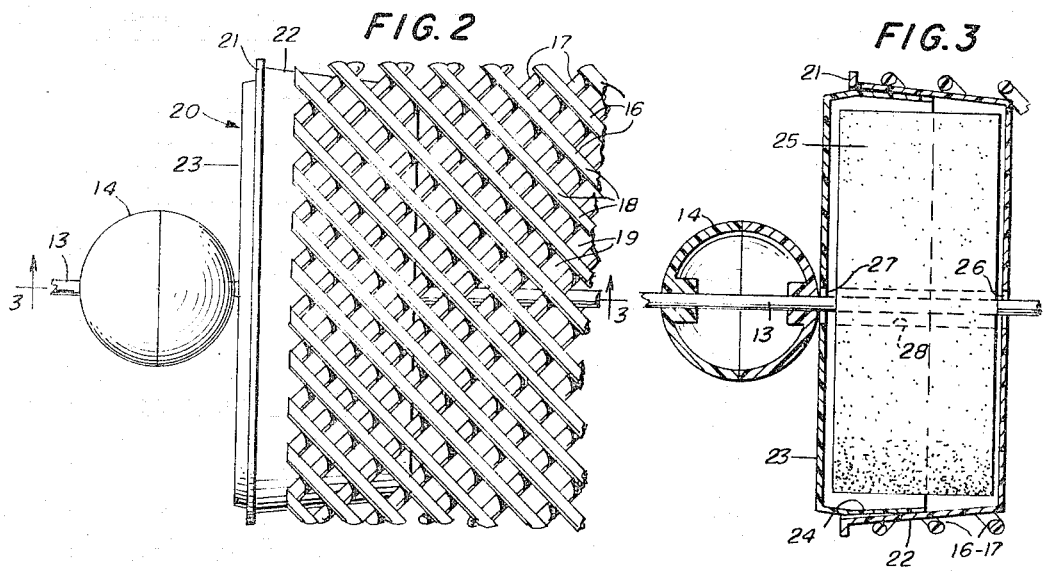
FIG. 2 is a view in elevation, on a greatly enlarged scale, of one end of one of the devices shown in FIG. 1.
FIG. 3 is a longitudinal cross-section in elevation of the end portion of the device shown in FIG. 2 and disclosing the interior construction of a float means for supporting the device in the water.

In the preferred form (as shown in FIG. 2) the body of the turbulence-reducing device may comprise a latticework arrangement having a plurality of thin strips 16 arranged in crisscrossing arrangement with another plurality of spaced strips 17, joined to each other at their points of intersection 18 to form a series of openings 19, each series of strips 16 and 17 being further arranged to extend helically in opposite directions respectively whereby the body as a whole resembles a cylindrical lattice.

In the form of device actually constructed, the strips 16 and 17 are formed of semi-rigid plastic strands approximately 2 mm. in diameter spaced so that the openings 19 are approximately 2 mm. square; the cylindrical body as a whole being about 3¾ inches in diameter and about a foot long. The ratio of the space occupied by the openings, to the total area of the surface of the cylindrical body just described, is approximately one to three. However, it will be appreciated that these dimensions and ratio can be varied and are not to be considered as limiting.

It will also be appreciated that while the body may be fabricated from materials which are buoyant, it could also be formed of metal or any other substantially rigid material, buoyant or not. However, to ensure proper positioning in the water, float means, indicated generally by the numeral 20, may be provided at each end of the body. In the preferred form shown, the float includes a cup-shaped member 21 having a tapered exterior surface 22 which is snugly received within each end of the body 15.

The cup-shaped member 21 is closed by a cap 23 having a cylindrical skirt 24 which is snugly received within the body of the cup 21 to form a hollow chamber within which is positioned a relatively thick disc 25 of a buoyant material such as cellular plastic. The cup 21, cap 23 and disc 25 are provided respectively with aligned central openings, 26, 27, and 28, all of which may be of a diameter substantially greater than that of the cable 13 so as to be freely slidable thereon.

Since the disc 25 is preferably composed of a cellular material of the type in which each of the cells is closed, there is no communication between them and it is not necessary to prevent the entry of water into the interior of the chamber through the openings 26 and 27.

The disc 25 is therefore non-absorptive and buoyant. However, the foamed plastic materials of which these discs may be formed are relatively fragile and the member 21 and cap 23 should be formed of some semi-rigid plastic material to provide a protective enclosure for the buoyant disc.

In operation, when the device 15 is positioned in the water, suspended so that approximately one half of its surface is exposed above the water line and restrained against horizontal movement, as by the cable 13, any lateral movement of water in a sidewise direction below the water line will be retarded because of the resistance offered during its passage through interstices 19 below the water line. Thus, that portion of the body below the water line has a damping effect on underwater currents.

This is more desirable than if the movement were positively blocked, as by a solid wall, since this would merely tend to throw the water back and create a backwash which would be just as objectionable. For this reason, the total area of the openings should be relatively high as compared to the area of the surface as a whole. In the modification just described, the ratio of the area of the openings to the area of the entire surface is about one-third. The ratio could be higher, but it is not desirable that it be much less because this simply increases the drag on the device and does not assist in damping water movement.

Similarly, if a wave approaches the turbulence device or tends to break over the upper portion of it, the approaching wall of water above the water line will not be thrown back, but will be impeded by passing through the upper portion of the latticework body. Thus, the crest of a wave will be broken up as it passes through the openings in the upper portion of the device and as it leaves the device on the other side, its force will be largely spent with the result that the water forming the crest of the wave will tend to merely drain out near the water line after it has passed through.

In addition, since the cable 13 passes through the approximate center of mass of the body and since the body is symmetrically formed with respect to this longitudinal axis, rotation of the body about the cable may occur due to unequal forces being exerted against the upper and lower portions thereof.

This rotation of the body during passage of water through the myriad openings in its surface assists in smoothing out wavelets by a shearing action.

Figure 5:
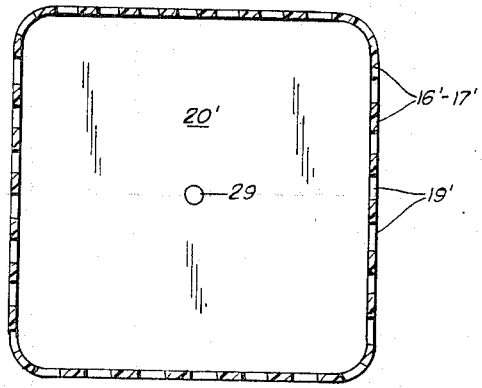
Figure 6:
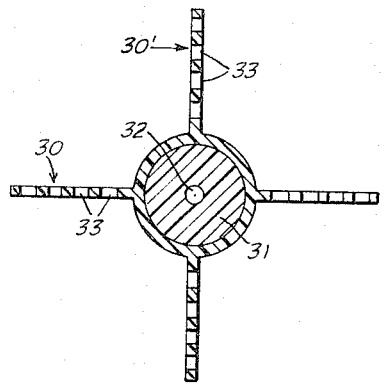
Figure 7:
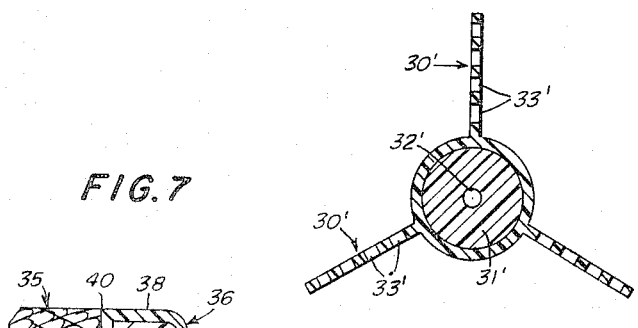

FIGS. 5, 6, and 7 illustrate cross-sectional views of alternative configurations for the body of a turbulence device according to the present invention.

In FIG. 5, the body has been formed of a plurality of spaced strips 16′ interlaced with other spaced strips 17′ to form a lattice-like structure having openings 19′ thus presenting an open-work, lattice-like structure similar to that of the modification previously described, but having a generally rectangular cross-sectional transverse outline.

In this form of the device, a rectangular float means, indicated generally by the numeral 20′ is provided to support the latticework body and having a centrally disposed opening 29 to loosely receive the cable 13. This modified form performs essentially in the same manner as the modification shown in FIGS. 2, 3, and 4.

Figure 4:
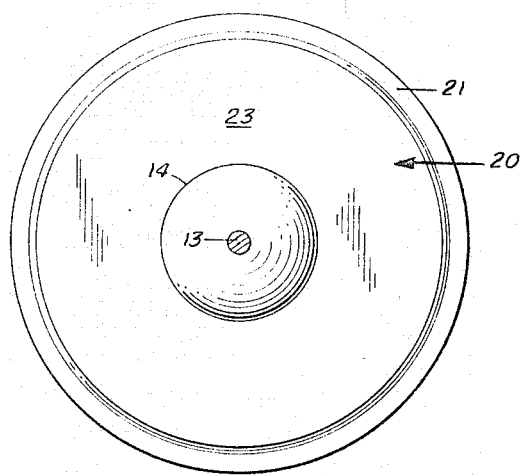
FIG. 4 is an end elevation of the device in FIG. 3.

While the modifications previously described have used a latticework structure composed of interleaved plastic strips, it will be obvious that in the alternative, the cylindrical body of the form shown in FIGS. 2, 3, and 4, and the rectangular body shown in FIG. 5, could be formed of a single piece of sheet material, either plastic, wood or metal, the entire surface of which is perforated by an innumerable number of closely spaced openings.

In FIG. 6, another form of the invention is shown in which a series of such perforated sheets 30 are arranged in a cruciform cross-sectional arrangement extending along the exterior of a float portion 31 which may extend along the entire length of the device, and thus be of relatively small diameter. This float, of course, is provided with a central passage 32 extending throughout the length of the float having a diameter sufficient to loosely receive the restraining cable 13 and enabling the float to support the device substantially half way submerged.

As in the case of the first two modifications, movement of the water from side to side either below the water line or above, will be impeded as it encounters any one of the plates 30 and flows through the series of openings 33. However, if, due to an unequal force exerted on the upper and lower half of the device, there is any tendency for it to revolve about the cable 13, the sheets 30 as they pass into and out of the water will exert a sort of paddle wheel effect additionally tending to modify and reduce water flow and to smooth out the waveform.

FIG. 7 shows a modification wherein three sheets of material 30′ are disposed symmetrically about an elongated float means 31′ having a passage 32′ for receiving the restraining cable 13. The openings in the sheets 31′ are indicated by the numeral 33′. Operation of this form of device is generally similar to that of the form shown in FIG. 6.

While the sheets 30 and 30′ can be flat, it should be understood that geometric variations of such surfaces would also be effective. For example, curved surfaces, such as corrugated, or helically curving sheets could be substituted.

Figure 8:
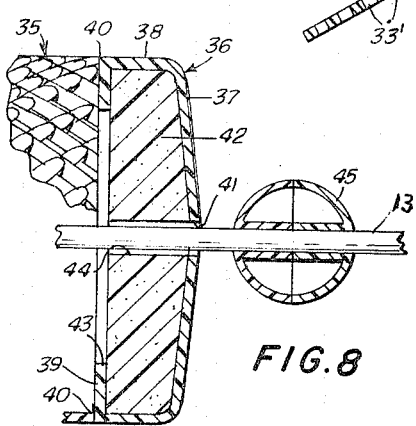

In the modified form of invention shown in FIG. 8, the lattice work body, indicated generally by numeral 35, is similar to the body shown in FIG. 2. However, the float means, indicated generally by numeral 36, is preferably formed from a single piece of relatively rigid plastic, or other similar material, having a cup-shaped form with an end wall 37 and an annular side wall 38 which terminates with an inwardly directed flanged portion 39 which abuts against the end of the body portion 35 and may be joined to it at 40 by adhesive, or other suitable means. An opening 41 is provided in the end wall to allow passage of the restraining cable 13.

Buoyancy is provided by a disc-shaped block of relatively yieldable closed-celled plastic material 42 which substantially fills the space between the end wall 37 and the flange 39. The diameter of the plastic block is larger than the opening formed by the inner edge 43 of the flange but, since the material is yieldable, it may be initially forced through this opening and, once it has been placed inside the body of the float means, will expand and return to its original size, thus keeping it in place. The block is also provided with a central passage 44, to receive the cable 13.

One or more small floats 45 may be placed on the cable between the turbulence reducing devices to space them apart.

Having disclosed several forms in which this invention may be practiced, it will be obvious to those skilled in the art that various changes and improvements may be made which would fall within the scope of the annexed claims.

I claim:

1. In a combination swimming lane marker and turbulence-reducing device, an elongated hollow body having a lengthwise central passage through which a restraining cable may be passed, float means for supporting said body with approximately one-half of the exposed surface of the body above the water line, the surface of the body being foraminous to permit water to pass transversely through substantially the entire body from one side to the other for damping the force of said water movement below the water line and smoothing the level of water waves above the water line.

2. The invention as defined in claim 1, wherein said float means includes a disc-shaped buoyant device at each end of the elongated body.

3. The invention as defined in claim 2, wherein said disc-shaped device includes a body of non-absorptive fragile buoyant cellular material contained within a hollow two-part semi-rigid protective enclosure.

4. The invention as defined in claim 3, wherein said elongated body is a cylindrical lattice of plastic material.

5. The invention as defined in claim 4, wherein the area of all of the openings in the elongated body is at least one-third of the area of the cylindrical surface as a whole.

6. A turbulence reducing device for marking swimming pool lanes comprising an elongated buoyant body having a longitudinally extending central passage for loosely receiving a restraining cable, said buoyant body including a plurality of generally similar planar longitudinally extending perforate surfaces projecting radially outwardly at circumferentially equally spaced intervals.

7. The invention as defined in claim 6, wherein there are three such longitudinally extending planar surfaces.

8. The invention as defined in claim 6, wherein there are four such longitudinally extending planar surfaces.

9. In a device for reducing wave turbulence in a body of water, comprising an elongated body, substantially the entire surface of said body having a plurality of closely spaced openings to permit the impeded passage of water through the body transversely from side to side, restraining means for positioning said body partially submerged at a horizontally fixed location in said body of water, said body also including rotary support means to allow the body to rotate freely about a longitudinal axis.

10. The invention as defined in claim 9, wherein said elongated body is in the form of a hollow cylinder.

11. The invention as defined in claim 9, wherein said elongated body is in the form of a hollow polygon.

12. The invention as defined in claim 11, wherein said hollow polygon is four sided.

13. A turbulence reducing device to float on a body of liquid, comprising an elongated perforate hollow body means having float means at each end, each said float means comprising a cup-shaped substantially rigid member having its open end joined with a respective end of the hollow body means, a disc-shaped block of relatively yieldable closed-celled plastic material substantially filling the interior of the cup-shaped member, and means for retaining the block within the member.

14. The invention as defined in claim 13, wherein the retaining means comprises an inwardly directed element provided on one of said first two mentioned means.

15. The invention as defined in claim 14, wherein said retaining means comprises a radial flange.

References Cited by the Examiner

UNITED STATES PATENTS

| | | | |
|---|---|---|---|
| 3,011,178 | 12/1961 | Stone | 4—172 |
| 3,050,750 | 8/1962 | Harrison | 9—8 |
| 3,074,083 | 1/1963 | Schirmer | 9—8 |
| 3,116,925 | 1/1964 | Welch | 9—8 |

LAVERNE D. GEIGER, *Primary Examiner.*

H. K. ARTIS, *Assistant Examiner.*